W. F. DEHUFF.
MIXING MACHINE.
APPLICATION FILED FEB. 6, 1911.
1,007,930.
Patented Nov. 7, 1911.
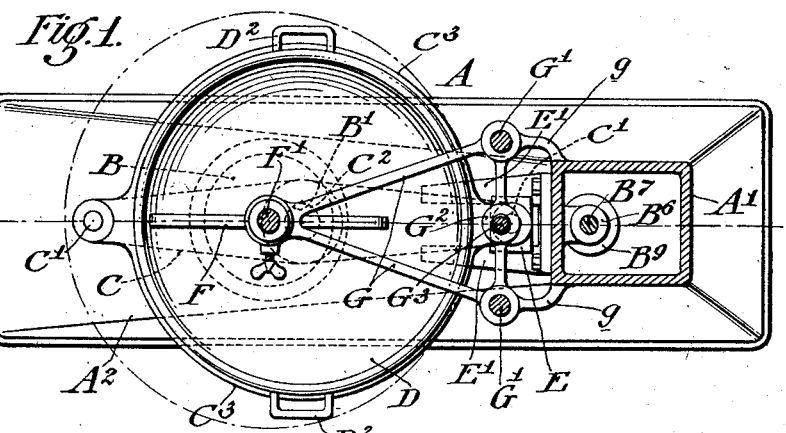
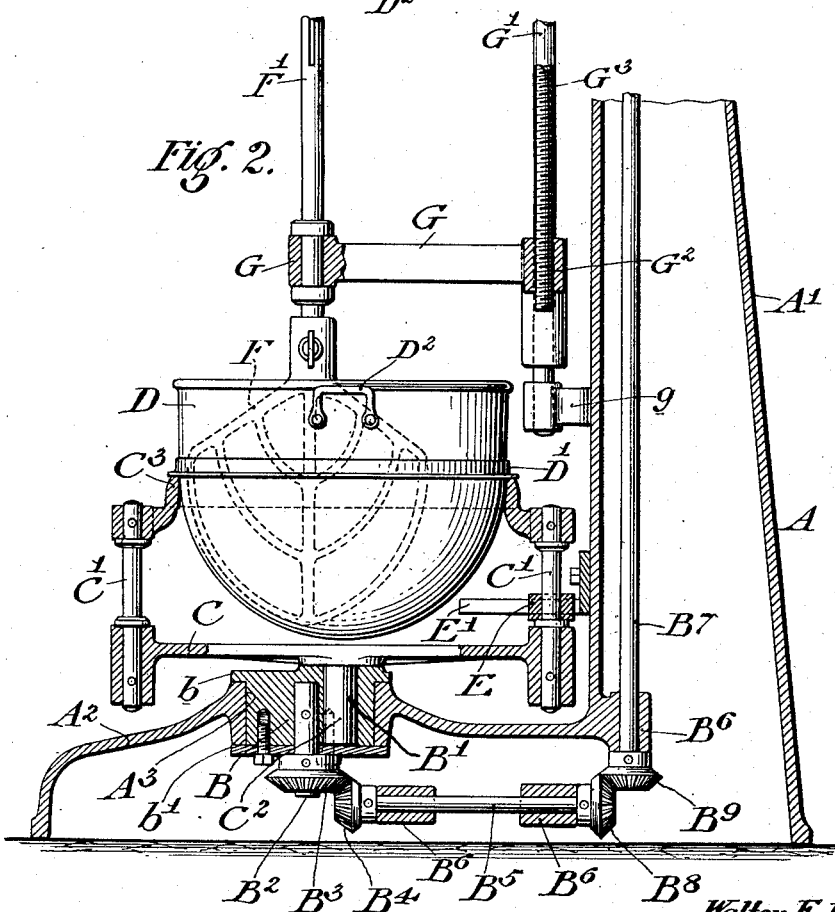
Witnesses
J. E. Hubbell
Inventor
Walter F. Dehuff,
by
Attorney

UNITED STATES PATENT OFFICE.

WALTER F. DEHUFF, OF YORK, PENNSYLVANIA, ASSIGNOR TO HARRY READ, OF YORK, PENNSYLVANIA.

MIXING-MACHINE.

1,007,930.  Specification of Letters Patent.  Patented Nov. 7, 1911.

Application filed February 6, 1911. Serial No. 606,753.

*To all whom it may concern:*

Be it known that I, WALTER F. DEHUFF, a citizen of the United States, residing at York, in the county of York and State of Pennsylvania, have invented certain new and useful Improvements in Mixing-Machines, of which the following is a specification.

My present invention relates to mixing machines for preparing bread and cake dough as well as performing other culinary operations, and particularly to mixing machines of relatively large size adapted to be operated by power.

The object of the invention is to simplify and improve the construction of mixing machines of this type, and in particular to provide an efficient and effectively disposed mechanism for imparting a gyratory or orbital motion to the bowl whereby the contents of the bowl may at every point be brought into engagement with the beater as the same turns on its axis.

The various features of novelty which characterize my invention are pointed out with particularity in the claims annexed to and forming a part of this specification. For a better understanding of the invention, however, and the advantages possessed by it, reference may be had to the accompanying drawings and descriptive matter in which I have illustrated and described one of the forms in which my invention may be embodied.

Referring now to the drawings:—Figure 1 illustrates a sectional plan of a mixing machine embodying my invention, and Fig. 2 represents a vertical section of the same taken on the line 2—2 of Fig. 1.

The standard A of the machine comprises an upright portion A' and a base portion $A^2$, the latter being provided with a flanged opening $A^3$ forming a bearing or journal for the reception of an eccentric B.

The standard A, a portion only of which is shown in the drawings, may be provided with the usual power transmitting mechanism for operating the several moving parts, such, for instance, as the driving mechanism shown and described in Letters Patent No. 966,765 dated August 9, 1910. As this, however, forms no part of the present invention, it is not thought necessary to illustrate or describe the same as other suitable power transmitting mechanism may be employed without departing from the scope of my invention.

Above the base of the standard A is a bowl support C, comprising a frame provided with uprights C' C' and a centrally disposed pin $C^2$ which is adapted to a hole B' in the eccentric. The lower ends of the uprights C' C' are fitted tightly in openings in projecting ends of the bowl support C, while the upper ends are in like manner fitted to holes in projections on a bowl ring $C^3$.

D is a bowl provided with a flange ring D' adapted to rest on the bowl ring and $D^2$ $D^2$ are handles by which the bowl may be lifted to and from its resting place in the supporting frame.

The mechanism by which a gyratory or eccentric motion is imparted to the bowl support and bowl comprises the eccentric B provided with a shaft $B^2$ upon which is mounted a bevel gear $B^3$ engaging a bevel pinion $B^4$ on a horizontal shaft $B^5$. The shaft $B^5$ is supported in bearings $B^6$ $B^6$ secured to or forming a part of the base of the standard A, as is also a vertical shaft $B^7$ which is driven from any suitable source of power and operatively connected to the shaft $B^5$ by bevel gears $B^8$ and $B^9$. The eccentric B is provided at its uppermost end with a flange $b$, and at its lowermost portion with a removable plate $b'$, and these serve to hold the eccentric within the limits of its bearing $A^3$.

For the purpose of transforming the revolving motion of the eccentric B which would otherwise be transmitted to the bowl support C and bowl D, one of the uprights C' is provided with a slidable block or crosshead E, adapted to guides E' fastened to the standard A. Thus the bowl is held from revolving upon its own axis, but is free to move in a path described by the motion of the eccentric pin $C^2$. The beater F is detachably secured to a vertical shaft F' which is journaled in a bracket G guided upon upright G' G' fastened to projections $g$, $g$ of the standard A. The shaft F' may be caused to revolve by any well known means. The bracket G is provided with an internally threaded boss $G^2$ to receive a screw $G^3$ which when turned by any suitable means will serve to move the bracket together with the beater into and out of engagement with the bowl.

The machine herein described possesses advantageous features. Among these may be mentioned a smoothness of aeration and mixing due to the motion of the bowl, which while producing goods exceedingly light and spongy, at the same time precludes the tendency to roughness due to cells or pores of large size in the texture of the material acted upon.

Having now described my invention, what I claim as new and desire to secure by Letters Patent, is:

1. A mixing machine comprising a standard, a bowl support journaled in the standard, a removable bowl, a vertically disposed beater, means for adjusting the beater to and from the bowl, means for turning the beater upon its axis, and means for changing the axial position of the bowl with respect to that of the beater.

2. A mixing machine comprising a supporting frame, a bowl support journaled therein, a detachable bowl, means for imparting a gyratory motion to the bowl, a vertically disposed beater, means for turning the beater upon its axis, and means for adjusting the beater to and from the bowl.

3. A mixing machine comprising a standard, a bowl support journaled in the standard, means for imparting a gyratory motion to the bowl support, as an eccentric, a beater mounted in journals guided upon the standard, means for revolving the beater upon its axis, and means for adjusting the vertical position of the beater.

4. In a mixing machine, a standard, a bowl support provided with an eccentric pin, an eccentric, means for turning the eccentric, means to prevent the bowl support from turning, a beater and means for revolving said beater.

5. In a mixing machine, a standard, a bowl support guided in the standard and provided with an eccentric pin, an eccentric, means for revolving the eccentric, a beater and means for revolving the beater.

6. In a mixing machine, a standard, a bowl support having a bowl-ring adapted to receive a bowl, and a depending eccentric pin, an eccentric, means for revolving the eccentric, a beater guided upon the standard, means for revolving the beater, and means for adjusting the vertical position of the beater.

7. In a mixing machine, a standard, a bowl support provided with a bowl, means for guiding the bowl support, means to impart an eccentric movement to the bowl support, a beater guided in the standard and means for rotating the beater.

8. In a mixing machine, a standard, a bowl support, a removable bowl, an eccentric pin depending from the bowl support and adapted to an eccentric, the eccentric journaled at the base of the standard, a mechanism for revolving the eccentric, guides secured to the standard to engage the frame of the bowl support, a beater, means for revolving the beater, and a screw for adjusting the beater to and from the bowl.

In testimony whereof I affix my signature in presence of two witnesses.

WALTER F. DEHUFF.

Witnesses:
  HARRY READ,
  L. E. HERR.

---

Copies of this patent may be obtained for five cents each, by addressing the "Commissioner of Patents, Washington, D. C."